United States Patent
Smits (10) Patent No.: US 7,944,211 B2
(45) Date of Patent: May 17, 2011

(54) CHARACTERIZATION OF FORMATIONS USING ELECTROKINETIC MEASUREMENTS

(75) Inventor: Anthony Smits, Kanagawa-Ken (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 401 days.

(21) Appl. No.: 11/964,730

(22) Filed: Dec. 27, 2007

(65) Prior Publication Data

US 2009/0167310 A1 Jul. 2, 2009

(51) Int. Cl.
*G01V 3/18* (2006.01)
*E21B 47/10* (2006.01)

(52) U.S. Cl. .................................. 324/353; 73/152.41

(58) Field of Classification Search .................. 324/353; 73/152.32, 152.39, 152.41
See application file for complete search history.

(56) References Cited

U.S. PATENT DOCUMENTS

| | | | |
|---|---|---|---|
| 2,433,746 A * | 12/1947 | Henri-Georges | 324/353 |
| 2,814,017 A * | 11/1957 | Henri-Georges | 324/353 |
| 2,974,273 A | 3/1961 | Vogel et al. | |
| 3,599,085 A * | 8/1971 | Semmelink | 324/386 |
| 4,427,944 A | 1/1984 | Chandler | |
| 5,417,104 A | 5/1995 | Wong | |
| 5,503,001 A * | 4/1996 | Wong | 73/38 |
| 6,225,806 B1 * | 5/2001 | Millar et al. | 324/353 |
| 6,462,549 B1 | 10/2002 | Curtis et al. | |
| 6,597,633 B1 | 7/2003 | Millar et al. | |
| 6,842,697 B1 | 1/2005 | Millar et al. | |
| 7,148,693 B2 | 12/2006 | Ligneul et al. | |
| 2006/0243047 A1 | 11/2006 | Terabayashi et al. | |
| 2007/0150200 A1 | 6/2007 | Charara et al. | |
| 2007/0256830 A1 * | 11/2007 | Entov et al. | 166/250.1 |

OTHER PUBLICATIONS

O.V. Mikhailov, J. Queen, M.N. Toskoz, "Using borehole electroseismic measurements to detect and characterize fractured (permeable) zones", Geophys, Vo. 65, No. 4, 2000, pp. 1098-1112.
A.H. Thompson, et al, "Field tests of electroseismic hydrocarbon detection", Geophys, vol. 72, No. 1, 2007, p. N1-N9.
Stephane Garambois, Michel Dietrich, "Seismoelectric wave conversions in porous media: Field measurements and transfer function analysis", Geophys, vol. 66, No. 5, pp. 1417-1430.
Steve Pride, "Governing equations for the coupled electromagnetics and acoustics of porous media", 1994 The American Physical Soc., Physical Review B, vol. 50, No. 21, pp. 678-696.
Kobayashi, Toshioka, Takahashi, Millar and Clarke, "Development of Practical EKL (Electrokinetic Logging) System", SPWLA 43rd Logging Symposium, Jun. 2-5, 2002.

* cited by examiner

*Primary Examiner* — John Fitzgerald
(74) *Attorney, Agent, or Firm* — Daryl R. Right; Jody DeStefanis; Jeff Griffin

(57) ABSTRACT

A method for characterization of a formation that includes inducing fluid motion in a formation while making electronic measurements.

21 Claims, 6 Drawing Sheets

CHARACTERIZATION OF FORMATIONS USING ELECTROKINETIC MEASUREMENTS

FIELD OF INVENTION

The present invention relates to petroleum exploration and more particularly to the characterization of geological formations relating to the exploration of petroleum.

BACKGROUND OF THE INVENTION

There is currently interest within the oil industry in the application of electrokinetic measurements for the evaluation of formations penetrated by wells. Applications of electrokinetic measurements include the estimation of parameters characterizing formation properties such as permeability, for fluid flow monitoring, detection of fractures and fluid contacts. Much of the current activity is associated with dynamic measurements using acoustic stimulation of the formation to induce fluid motion by sonic or seismic means. For example, acoustic-electric coupling to measure permeability through electrokinetic effects is described in a 1957 patent, U.S. Pat. No. 2,974,273 entitled "Method and Apparatus for Investigating Earth Formations", Vogel and Weiser (Shell).

Much of the current activity involves acoustic (either using downhole sonic sources or seismic techniques) excitation to generate electrokinetic effects. Recent examples are M. Charara and P. Ligneul, U.S. Pat. No. 7,148,693, Process and Device for Prospecting a Porous Geological Formation, and M. Charara and P. Ligneul, U.S. Patent Publication No. 2007/0150200A1, Characterizing Properties of a Geological Formation by Coupled Acoustic and Electromagnetic Measurements.

Of particular relevance is a 1984 patent by R. Chandler, U.S. Pat. No. 4,427,944 entitled "System for Permeability Logging by Measuring Streaming Potential", which discloses the use of a test tool in conjunction with electrokinetic measurements said to have influenced the RFT (Repeat Formation Tester).

Other recent publications include:

Po-Zen Wong, U.S. Pat. No. 5,417,104, Determination of Permeability of Porous Media by Streaming Potential and Electro-osmotic Coefficients.

S. Garambois and M. Dietrich, Seismoelectric Wave Conversion in Porous Media: Field Measurements and Transfer Function Analysis, Geophysics 66(5) 2001, pp. 1417-1430.

Millar et al., U.S. Pat. No. 6,597,633, Method for Electrokinetic Downhole Logging.

Millar et al., U.S. Pat. No. 6,842,697, Method for Downhole Logging.

Kobayashi, Toshioka, Takahashi, Millar and Clarke, Development of Practical EKL (Electrokinetic Logging) System, SPWLA 43$^{rd}$ Logging Symposium, Jun. 2-5, 2002.

SUMMARY OF THE INVENTION

A method according to the present invention provides an improvement over the prior techniques for electrokinetic measurements. Thus, in a method according to the present invention information from downhole fluid analysis is used to better interpret both electrokinetic measurements and the pressure/flow rate measurements of downhole sampling, which can be used to quantitatively control flow rates of fluid in the formation to provide additional data for analysis.

A method according to the present invention is directed at the evaluation and characterization of formations using electrokinetic measurements, and includes inducing fluid motion in a formation to produce a continuous flow of formation fluid within the formation, and performing electrokinetic measurements during said fluid motion.

In one preferred embodiment, the fluid motion is induced through pumping the formation fluid using, for example, the probe of a downhole formation test tool.

In another embodiment, the rate of pumping is varied to vary the rate of fluid motion, while the amplitude of the electrokinetic signal(s) is correlated to the rate of fluid motion. Alternatively, the phase of the electrokinetic signal(s) may be correlated with the fluid motion.

In yet another embodiment, the pattern of flow of the formation fluid may be altered while electrokinetic measurements are made. For example, by drawing fluid through multiple probes and/or packers or by deploying a compound probe comprising a main probe and a guard probe the pattern of flow in the formation may be controlled.

In a further embodiment, the motion is induced by a tool which includes a downhole fluid analysis module to perform downhole fluid analysis to interpret the electrokinetic measurements. The downhole analysis may include determination of formation fluid composition analysis to estimate the total flow carrying charges in the formation, determination of fluid parameters and using the electrokinetic measurements in conjunction with the fluid parameters to estimate a formation property, the fluid parameters including, for example, one of resistivity, pH, density, and viscosity. A formation property which can be measured using a method according to the present invention is formation permeability.

In an additional embodiment, pressure transients are measured and permeability estimates are derived using the pressure transients measurements and the electrokinetic measurements.

In one embodiment of the present invention, a plurality of electrodes are disposed vertically along a sidewall of a borehole, and electrokinetic measurements are made using signals obtained from the electrodes. The electrokinetic measurements so made are used to determine a pattern of flow of the formation fluid. The electrokinetic measurements so made can also be used to determine the variation of the permeability along the sidewall of the well bore. In addition, the electrokinetic measurements can be used to determine the thickness of the formation.

Other features and advantages of the present invention will become apparent from the following description of the invention which refers to the accompanying drawings.

DETAILED DESCRIPTION OF THE INVENTION

Figure 1:
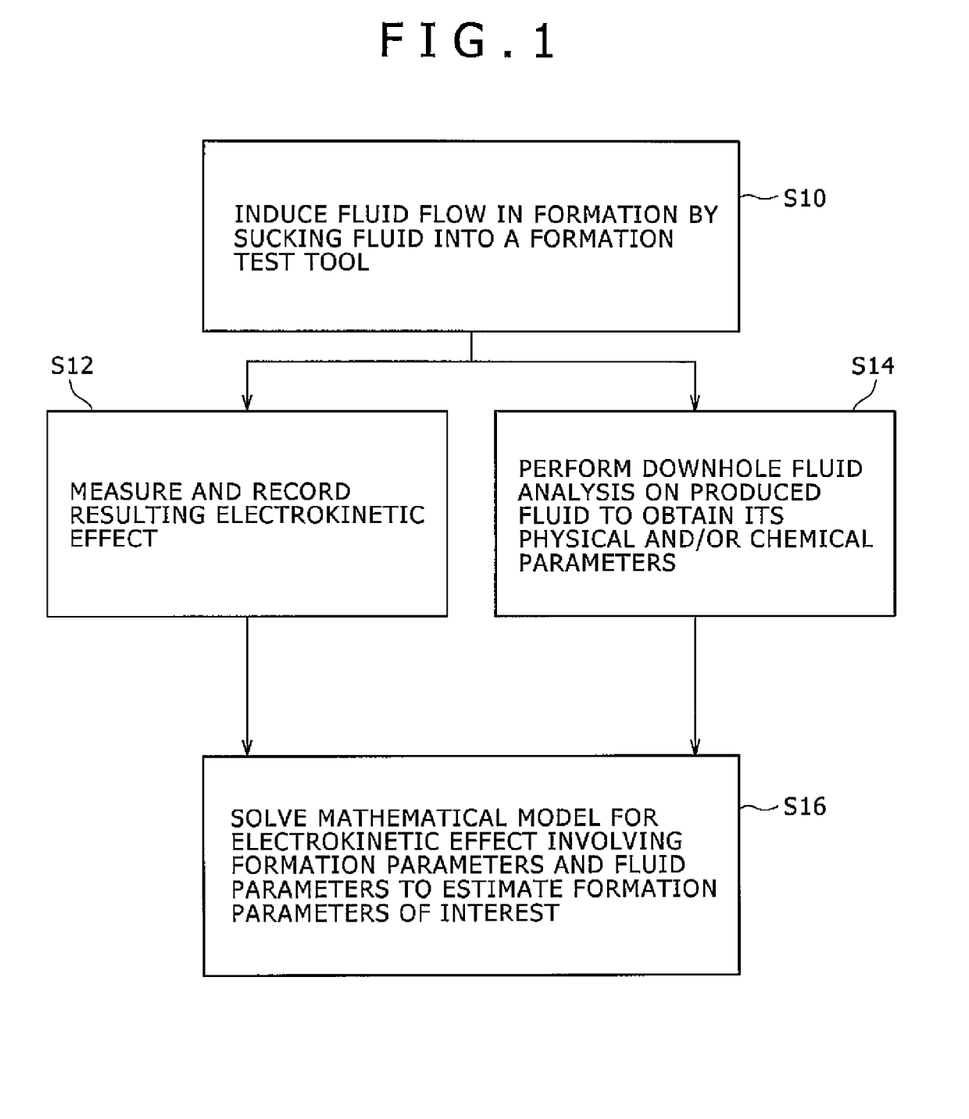
FIG. 1 outlines steps in a method according to the present invention.
Figure 2:
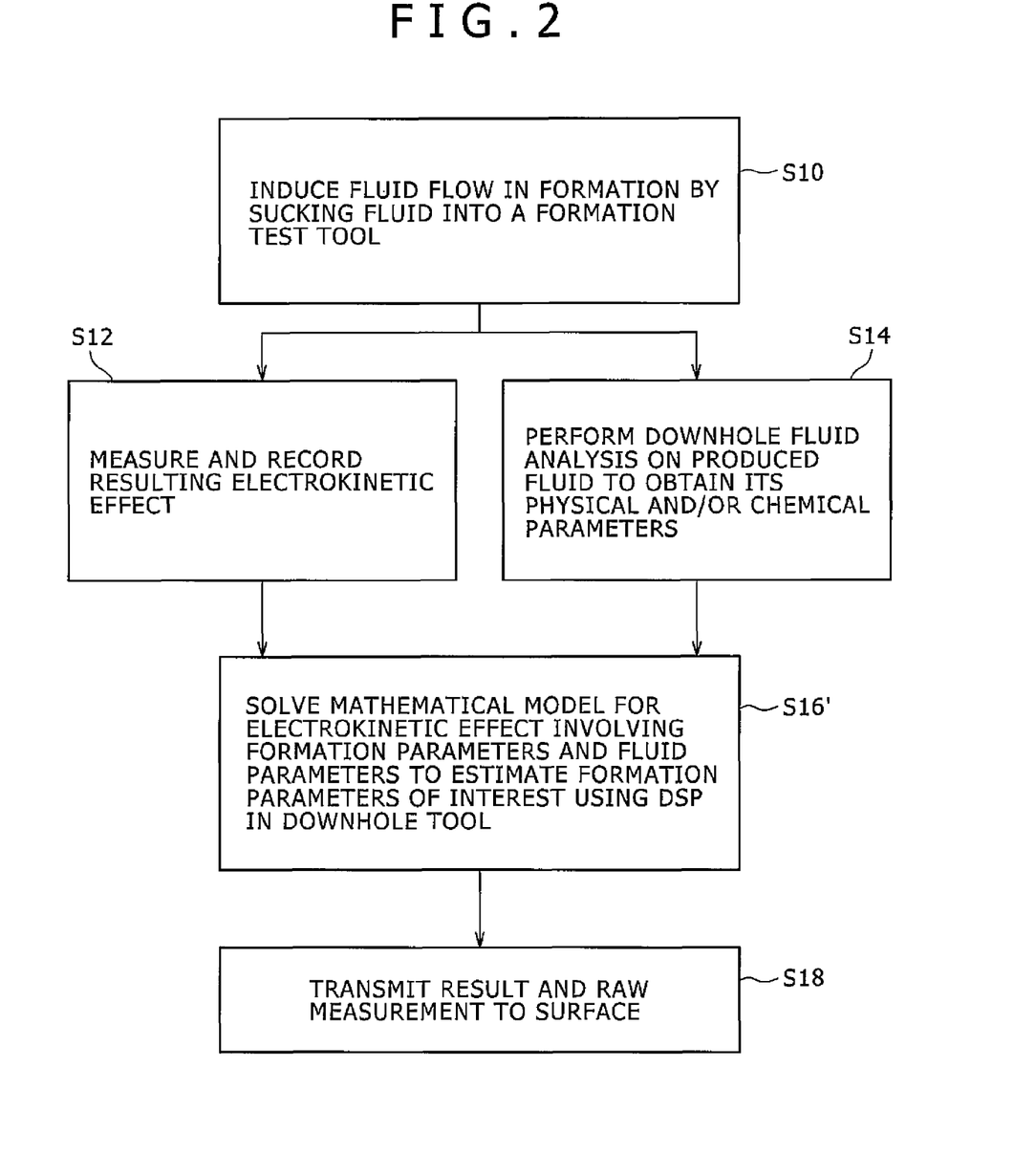
FIG. 2 outlines steps in a method according to the second embodiment of the present invention.

Referring to FIG. 1, in a method according to the present invention, fluid flow in a formation is induced S10, for example, by pumping, using a test tool such as a modular dynamic tester (MDT) available from Schlumberger, the assignee of the present invention. In step S10, fluid is sucked into the formation test tool. While fluid is in motion, electrokinetic measurements are made S12 and preferably recorded by the test tool. At the same time, downhole fluid analysis is performed S14 on the fluid that is being collected by the test tool to obtain physical and/or chemical parameters of the fluid. Next, a mathematical model is solved for the electrokinetic effect involving formation parameters and fluid parameters to estimate formation parameters of interest S16.

An example, of a mathematical model that can be used to estimate a formation property, e.g., permeability (k), is given by equations available from U.S. Pat. No. 4,427,944 and EP 0,043,768 B1. The entire contents of the aforementioned U.S. Pat. No. 4,427,944 are hereby incorporated herein by reference. Specifically, the following formulas can be used:

$$E_s(R, t) = \frac{-\varepsilon\zeta}{4\pi\mu\sigma} P_o(1 - a/R)e^{-t/T_{bellows}} \quad (1)$$

$$T_{bellows} = \frac{Al}{4\pi aY}\frac{\mu}{k} \quad (2)$$

These equations model injection of fluid into a formation from a flexible reservoir (such as a bellows) with cross section A, length l, a radius of injection aperture $\alpha$, and Young's modulus Y. The electrokinetic response $E_s$, at a distance R from the source is given in terms of a step force applied to the reservoir $P_o$, the permeability of the formation k, the viscosity of the fluid $\mu$, the conductivity $\sigma$, dielectric constant $\in$ and zeta potential $\zeta$.

Note that the parameters $\mu$ (viscosity) and $\sigma$ (conductivity) can be directly measured by downhole fluid analysis. Other information from downhole fluid analysis (such as pH) may help to estimate $\zeta$, the zeta potential term, that appears in equation (1). In addition, when a mixture of hydrocarbon and aqueous fluids are present, downhole fluid analysis will give information about their relative concentrations and their relative mobility.

Figure 3:
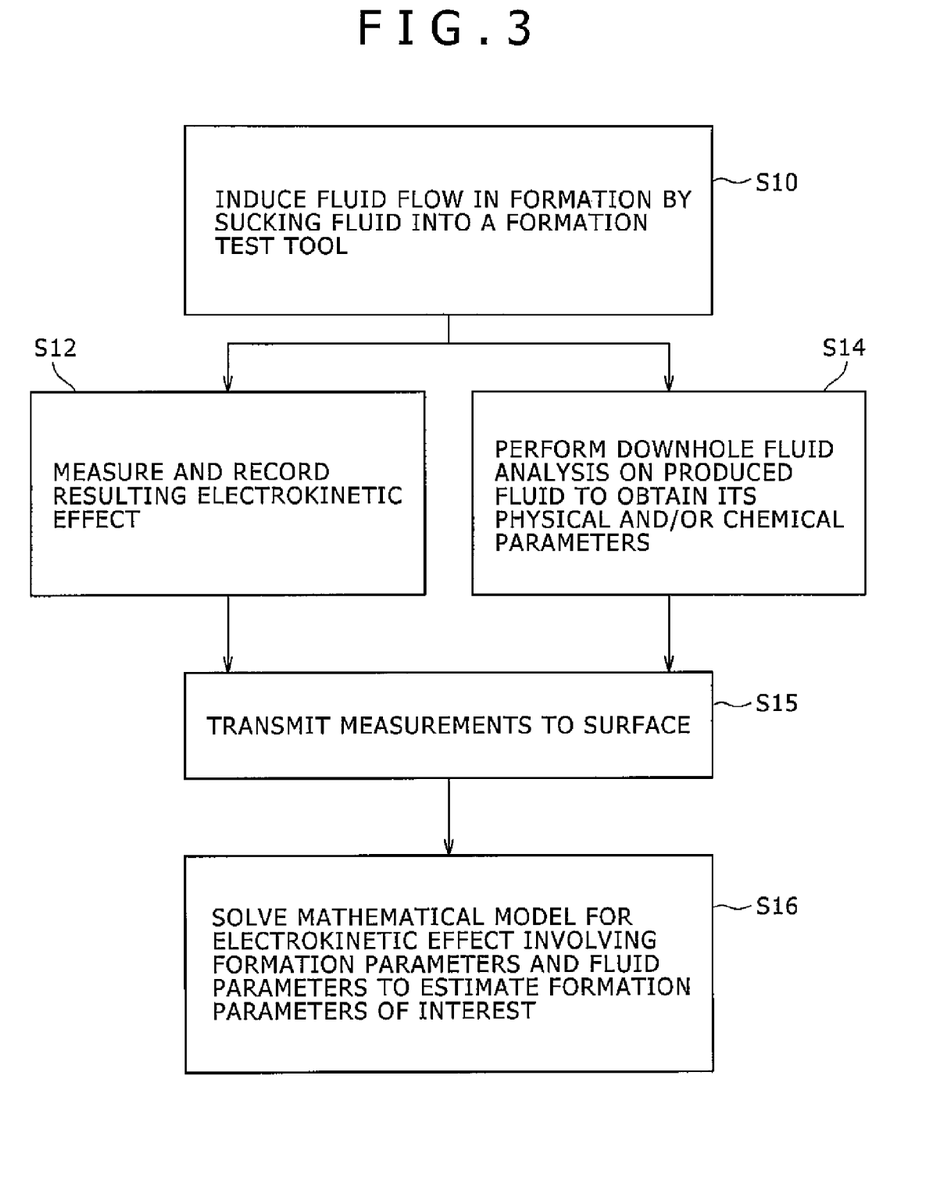
FIG. 3 outlines steps in a method according to the third embodiment of the present invention.

Referring now to FIG. 3, in which like numerals identify like steps, in a method according to a third embodiment, measurements from steps S12, S14 are first transmitted to the surface S15 from a downhole location, and the mathematical model is solved S16 at the surface.

Figure 4:
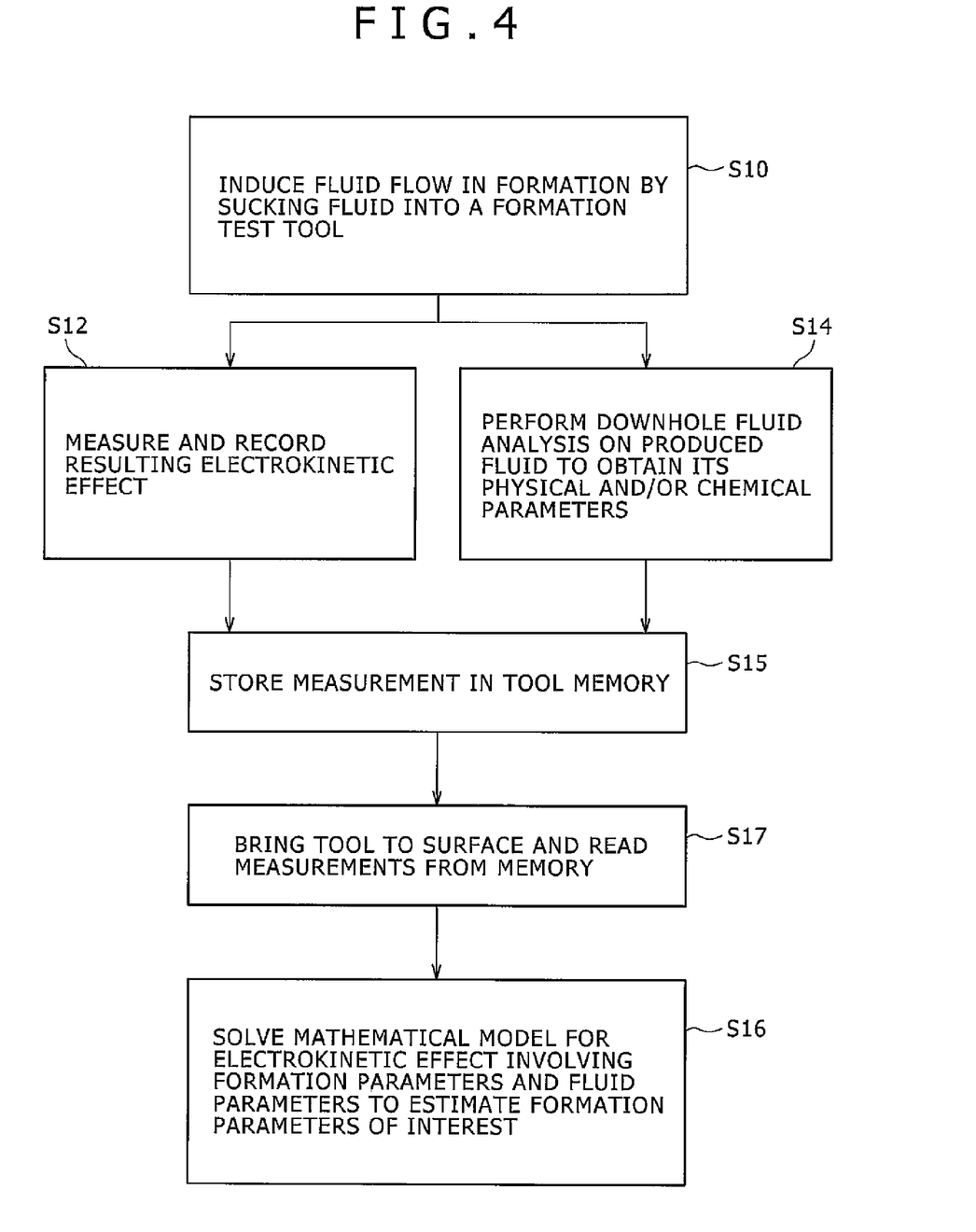
FIG. 4 outlines steps in a method according to the fourth embodiment of the present invention.

Referring now to FIG. 4, in which like numerals identify like steps, in a method according to the fourth embodiment, measurements from steps S12, S14 are stored in a memory location in the tool S15, the tool is brought back to the surface and the measurements are read out form the memory S17 at the surface, and then the mathematical model is solved S16 at the surface.

A preferred means of inducing fluid motion in the formation and thus an electrokinetic signal is a formation test tool that can produce a continuous flow of fluid within the formation. A number of such formation test tools are available in the field. Older tools include the Formation Interval Test Tool (FIT), and the Repeat Formation Test Tool (RFT). A currently used Modular Formation Dynamics Tester (MDT) (available from Schlumberger, the assignee of the present application) provides the ability to pump fluid out of the formation and to perform at least basic downhole fluid analysis.

Figure 5:
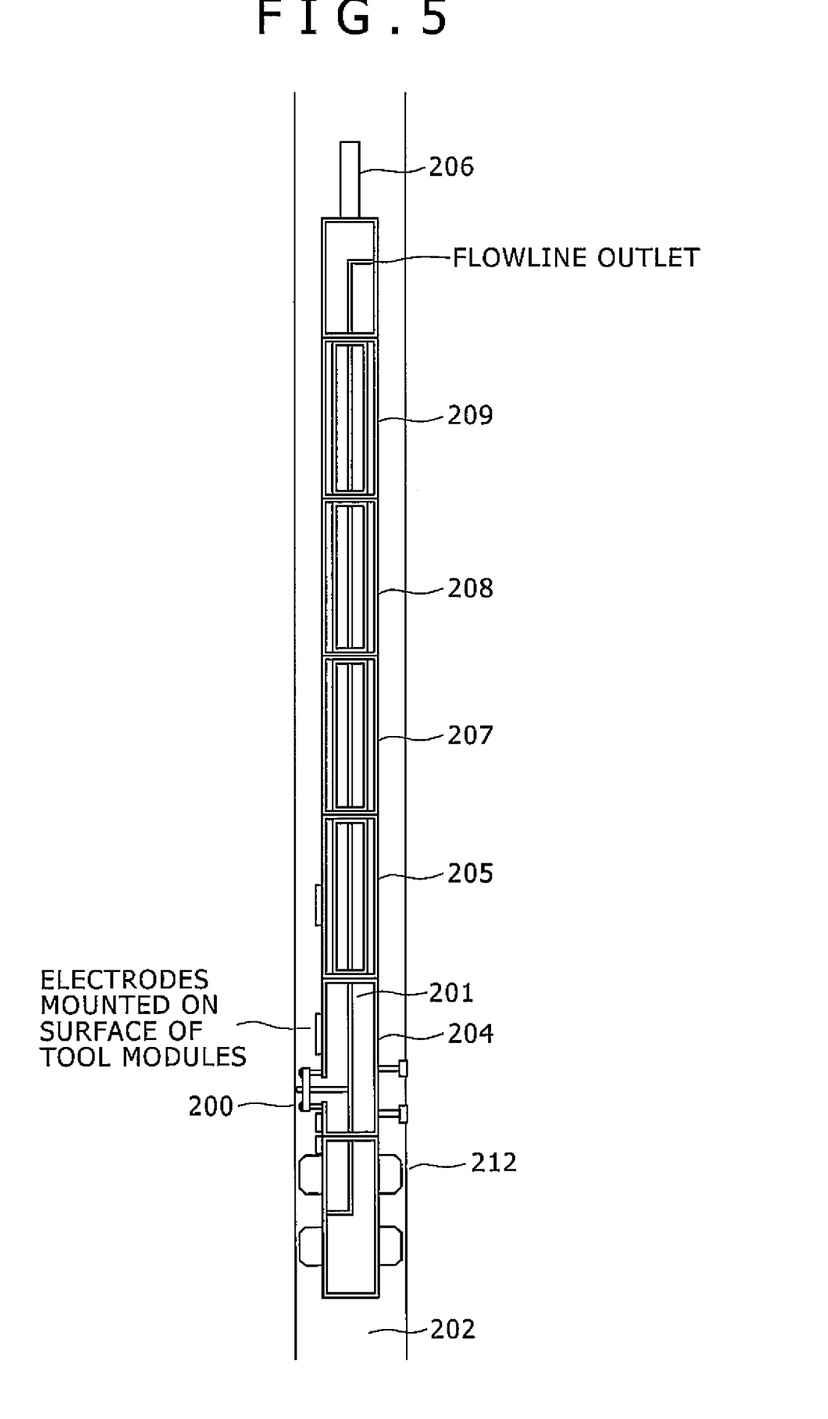
FIG. 5 illustrates one embodiment of a test tool residing in a borehole adapted for the practice of a method according to the present invention.

According to an aspect of the present invention, a downhole formation testing tool, such as an MDT, can be adapted to perform a method according to the present invention. Referring specifically to FIG. 5, the downhole formation tester tool according to the preferred embodiment includes a seal probe 204 to establish communication between a reservoir formation 200 and an entry port of a flow line 201 in a borehole 202, a hydraulic module 205 to control seal probe 204 and to set the same at the desired depth, one or more downhole fluid analysis module(s) 207, a pump module 208, a sample chamber 209, and formation tester tool conveyance 206, which can be either a wireline or a drill string. The module configuration is not limited to the previous description and the order of the modules can be changed or other modules can be added. In particular, a packer module 212 may be substituted for or included with the seal probe described above and multiple probe and/or packer modules may be combined in a given tool string. Note that a tool according to the preferred embodiment is of the wireline variety. It should, however, be noted that a tool that is conveyed via a pipe is within the scope and spirit of the present invention. A method according to the present invention thus can be applicable to drilling and measurement applications, specially testing, completion, and in general to any method related to formation characterization.

In a method according to the preferred embodiment, seal probe 204 engages a surface of a sidewall of borehole 202 to establish fluid communication with the same, according to any desired method for the use of such seal probes. Thereafter, pump out module 208 is activated either automatically through programming or from the surface to cause seal probe 204 to suck fluid from the sidewall of borehole 202 in order to induce fluid motion in the formation. While fluid is in motion, electrodes 210 residing on the surface of the modules (e.g. probe module 204 and hydraulic module 205) which are in contact with the sidewall of borehole 202 are activated to measure electrokinetic activity. The information collected by each electrode 210 is then transmitted to the tool, for example, to downhole fluid analysis module 207. At this stage, the information may be stored in an electronic facility (for subsequent analysis) in, for example, module 207, and/or transmitted to the surface via wireline 201 for storage and subsequent analysis. Note that tool 203 may include a controller for controlling the operation of electrodes 210 downhole, or electrodes 210 may be controlled by a controller at the surface via wireline 201.

Figure 6:
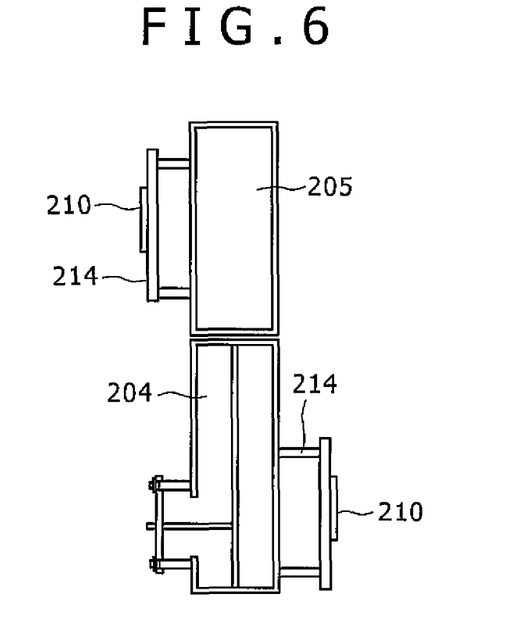
FIG. 6 illustrates a second embodiment of a test tool adapted for the practice of a method according to the present invention.

Referring now to FIG. 6, in another embodiment, electrodes 210 may be mounted on pressure pads 214 of the test tool modules.

Figure 7:
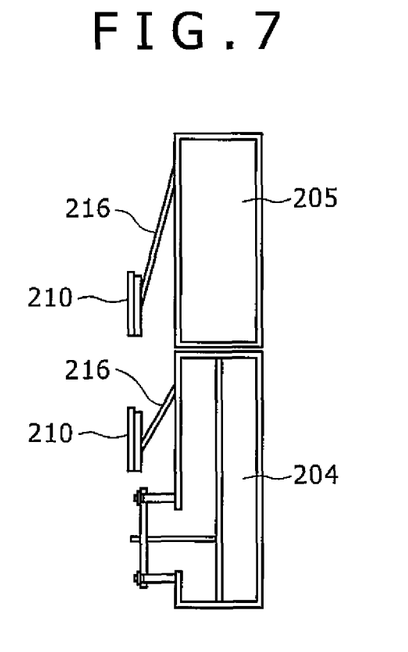
FIG. 7 illustrates a third embodiment of a test tool adapted for the practice of a method according to the present invention.

Referring now to FIG. 7, in yet another embodiment, electrodes 210 can be mounted on caliper arms 216 attached to test tool modules.

Formation testers that measure, for example, permeability using a probe make point measurements at a given depth. When using a packer the measurement is still confined to a relatively short interval of borehole. The array of electrodes arranged vertically on a sidewall over a given depth interval of the borehole to measure electrokinetic effects generated by a formation tester will provide information simultaneously at the probe/packer depth as well as at depths offset from the probe/packer depth. From this information inferences can be made about the pattern and distribution of flow within the formation being probed and/or about the variation of the permeability along the well bore axis and thus the distribution of permeability within the formation. The electrode array may also provide information on actual or effective formation thickness.

By varying the rate at which fluid is drawn from the formation, the effect of fluid displacement on the electrokinetic signal can be observed. Thus, according to one aspect of the present invention, the flow of fluid is controlled, either by control of the speed of a pump-out module or by control of flow into sample chamber 209, and the rate of fluid flow is correlated with the amplitude (and/or phase) of an electrokinetic signal. In one preferred embodiment, multiple probes or a compound probe may be used to alter the flow pattern within the formation to provide information about inhomogeneity and anisotropy within the formation. By observing how the electrokinetic signal varies both at the probe/packer and along the well bore as a function of the absolute and relative flowrates through the guard and sampling probes, it is possible to better estimate the variation of permeability and other formation properties in the volume of formation under test.

Further, in another embodiment, downhole fluid analysis can be used to aid the interpretation of the measured electrokinetic signal. For example, the analysis of the composition (hydrocarbon/water fractions) will permit the estimation of the fraction of the total flow carrying charges in the formation. Knowledge of the water chemistry from the resistivity cell, pH measurement, density/viscosity sensors and other means can be used in connection with the electrokinetic measurements to estimate formation properties such as permeability.

Direct measurement of fluid properties (such as fluid density and viscosity) under downhole conditions can provide improved estimates of permeability. An important input to the interpretation of the electrokinetic signal is the so-called "ζ-potential", the potential at a solid-liquid interface that characterizes the electrokinetic effect. Knowledge of the fluid chemistry inferred from downhole measurements of resistivity, pH, or other fluid characteristics can aid in the estimation of the ζ-potential. Furthermore, electrokinetic effects measured when only a single phase fluid is flowing may be different than when several phases are flowing. Downhole fluid analysis to provide volume fraction analysis and composition analysis may be used to distinguish between single phase flow and multiphase flow. In the case of more than one phase flowing, the volume fraction and composition analysis can be employed to estimate the relative flow rates and so aid the interpretation of the electrokinetic signal(s).

In a further embodiment, permeability estimates can be derived from both pressure transient measurements and electrokinetic measurements to improve the accuracy and reliability of the permeability estimate.

While in the preferred embodiment fluid motion is induced by a formation test tool, other methods to induce fluid motion can be employed without deviating from the scope and the spirit of the present invention. Thus, for example, fluid motion may be induced acoustically as described in the prior art, or by varying the pressure inside a borehole (either during testing or during production) to induce flow from the formation into the borehole or from the borehole into the formation.

Moreover, while as described herein electrode for measuring the electrokinetic signal are deployed with a formation test tool (either mounted on the surface of the formation test tool or on caliper arms to enable direct contact with the formation) other methods can be employed without deviating from the scope and spirit of the present invention. For example, the electrodes for electrokinetic measurement could be part of a permanent monitoring assembly deployed prior to performing the downhole fluid analysis/electrokinetic measurements and left in place afterwards. In addition, for example, the electrodes could be part of a production logging tool string that can provide downhole fluid analysis, or mounted on a drill string that enables fluid sampling and downhole fluid analysis capabilities.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for the evaluation of formations using electrokinetic measurements, comprising:
    positioning a tool with a pump module and a downhole fluid analysis module at a downhole location of a borehole traversing a formation;
    using said pump module to pumping formation fluid into said downhole fluid analysis module while producing a continuous flow of formation fluid within said formation whereby fluid motion is induced in said formation;
    performing electrokinetic measurements on said fluid motion and downhole fluid analysis on said formation fluid in said downhole fluid analysis module; and
    determining a formation property based on said electrokinetic measurements and said downhole fluid analysis.

2. The method of claim 1, further comprising altering a flow pattern within said formation.

3. The method of claim 1, further comprising measuring pressure transients and deriving permeability estimates using said pressure transients measurements and said electrokinetic measurements.

4. The method of claim 1, wherein said fluid motion is induced acoustically.

5. The method of claim 1, wherein said electrokinetic measurements are performed by electrodes residing on a tool that induces said fluid motion.

6. The method of claim 1, wherein results of said downhole fluid analysis are used to estimate formation properties based on a model describing electrokinetic effect.

7. The method of claim 1, further comprising disposing a plurality of electrodes vertically along a sidewall of a borehole, and performing electrokinetic measurements using signals obtained from said electrodes.

8. The method of claim 7, wherein said electrokinetic measurements are used to determine the variation of the permeability along said sidewall of said well bore.

9. The method of claim 1, wherein said downhole fluid analysis comprises determining at least one of formation fluid composition, fluid parameters and formation fluid chemical characteristics.

10. The method of claim 9, wherein said formation fluid composition is used to estimate the total flow carrying charges in the formation.

11. The method of claim 9, wherein said fluid parameters and said electrokinetic measurements are used to estimate the formation property.

12. The method of claim 11, wherein said fluid parameters include one of resistivity, pH, density, and viscosity.

13. The method of claim 11, wherein said formation property is permeability.

14. The method of claim 9, wherein said formation fluid chemical characteristics is used to determine ζ potential.

15. The method of claim 14, wherein said chemical characteristics include one of resistivity, and pH.

16. The method of claim 1, wherein a rate of pumping is varied to vary the rate of fluid motion.

17. The method of claim 16, further comprising correlating the amplitude of an electrokinetic signal with a rate of fluid motion.

18. The method of claim 16, further comprising correlating the phase of an electrokinetic signal with a rate of fluid motion.

19. The method of claim 1, wherein said tool includes a formation fluid sample chamber, and further comprising varying flow into said sample chamber to control said fluid motion within said formation.

20. The method of claim 19, further comprising correlating the amplitude of an electrokinetic signal with a rate of fluid motion.

21. The method of claim 19, further comprising correlating the phase of an electrokinetic signal with a rate of fluid motion.

* * * * *